(12) United States Patent
Bartlett et al.

(10) Patent No.: US 9,365,166 B2
(45) Date of Patent: Jun. 14, 2016

(54) VEHICLE PILLAR CONSTRUCTION AND METHOD

(71) Applicant: HONDA MOTOR CO., LTD., Tokyo (JP)

(72) Inventors: Mark David Bartlett, Dublin, OH (US); Hiroaki Taniguchi, Tochigu (JP); Ben Edward Sapak, Holland, MI (US); Shane M. Vorac, Grand Haven, MI (US)

(73) Assignees: HONDA MOTOR CO., LTD., Tokyo (JP); JOHNSON CONTROLS TECHNOLOGY COMPANY, MI (US)

( * ) Notice: Subject to any disclaimer, the term of this patent is extended or adjusted under 35 U.S.C. 154(b) by 35 days.

(21) Appl. No.: 13/795,836

(22) Filed: Mar. 12, 2013

(65) Prior Publication Data

US 2014/0265448 A1    Sep. 18, 2014

(51) Int. Cl.
  *B60R 13/02*    (2006.01)
  *B62D 25/04*    (2006.01)
  *B62D 65/14*    (2006.01)
  *B29C 45/14*    (2006.01)

(52) U.S. Cl.
  CPC ......... *B60R 13/025* (2013.01); *B29C 45/14811* (2013.01); *B60R 13/0206* (2013.01); *B62D 25/04* (2013.01); *B62D 65/14* (2013.01); *Y10T 29/49826* (2015.01); *Y10T 156/10* (2015.01)

(58) Field of Classification Search
  CPC .... B60R 13/0206; B60R 13/025; B60R 13/02
  USPC ....................................................... 296/1.08
  See application file for complete search history.

(56) References Cited

U.S. PATENT DOCUMENTS

| 5,709,925 | A | 1/1998 | Spengler et al. |
|---|---|---|---|
| 6,332,643 | B1 | 12/2001 | Sukegawa et al. |
| 6,340,203 | B2 | 1/2002 | Enomoto et al. |
| 6,357,812 | B1 * | 3/2002 | Adachi ............... B60R 13/025 280/748 |
| 7,021,700 | B2 | 4/2006 | Yoshida |
| 7,080,868 | B2 | 7/2006 | McClure et al. |
| 7,677,645 | B2 | 3/2010 | Henkelmann |
| 8,039,047 | B2 | 10/2011 | Sepeur et al. |
| 8,119,725 | B2 | 2/2012 | Lustiger et al. |
| 2005/0266232 | A1 | 12/2005 | Wang et al. |
| 2006/0264555 | A1 | 11/2006 | Lustiger et al. |
| 2007/0085361 | A1 * | 4/2007 | Hauser ........................ 296/1.08 |
| 2008/0070019 | A1 | 3/2008 | Good et al. |
| 2009/0011210 | A1 | 1/2009 | Gao et al. |

(Continued)

FOREIGN PATENT DOCUMENTS

| DE | 19704195 C1 | 10/1998 |
|---|---|---|
| DE | 10124138 A1 | 12/2002 |

(Continued)

OTHER PUBLICATIONS

Azdel, Inc., Product Datasheet for SuperLite VGX®, Mar. 13, 2007, 1 page.

*Primary Examiner* — Glenn Dayoan
*Assistant Examiner* — Melissa A Black
(74) *Attorney, Agent, or Firm* — Kenealy Vaidya LLP

(57) ABSTRACT

An automotive vehicle including a pillar assembly. The pillar assembly comprises a structural reinforcement member and an associated garnish. The garnish is constructed of an elongated polypropylene inner layer mated to a cooperatively shaped fiber filled outer layer.

21 Claims, 4 Drawing Sheets

(56) References Cited

U.S. PATENT DOCUMENTS

2009/0130443 A1 5/2009 Lustiger
2010/0323182 A1* 12/2010 Hashiba et al. ............ 428/297.4
2012/0001445 A1* 1/2012 Hajiri et al. ................ 296/1.08
2012/0104784 A1* 5/2012 Sapak et al. ................ 296/1.08

FOREIGN PATENT DOCUMENTS

| DE | 10308574 A1 | 9/2004 |
| DE | 102004009244 A1 | 4/2005 |
| EP | 1775110 A1 | 4/2007 |

* cited by examiner

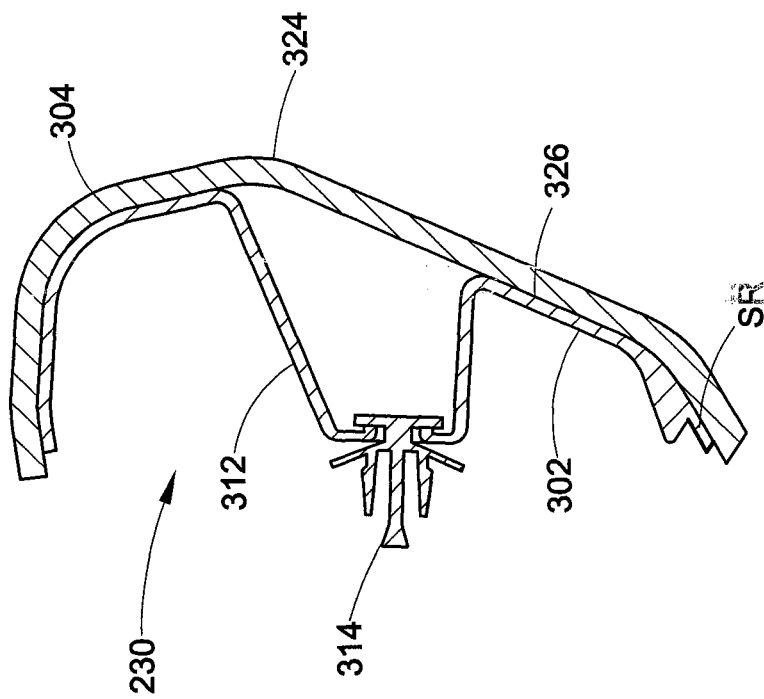
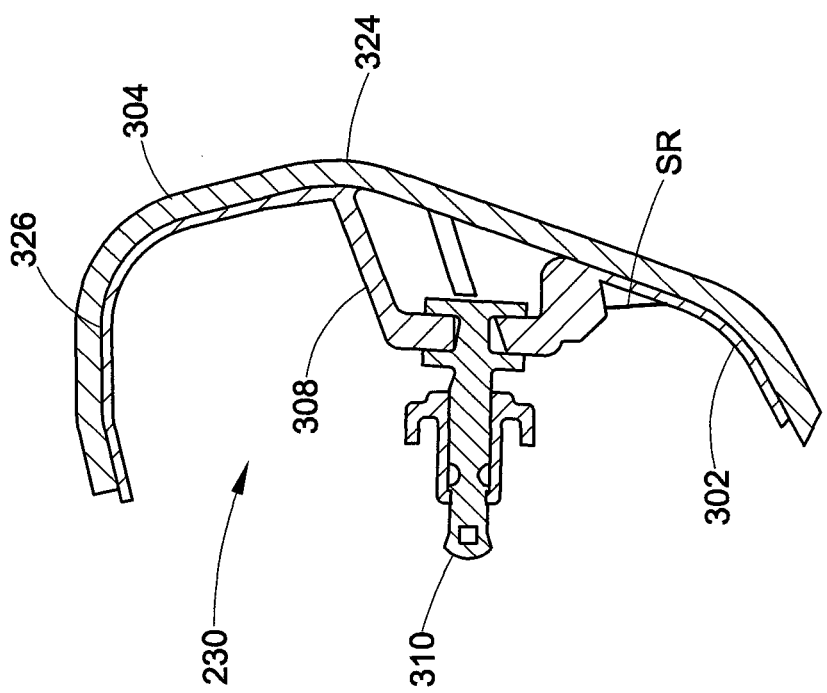

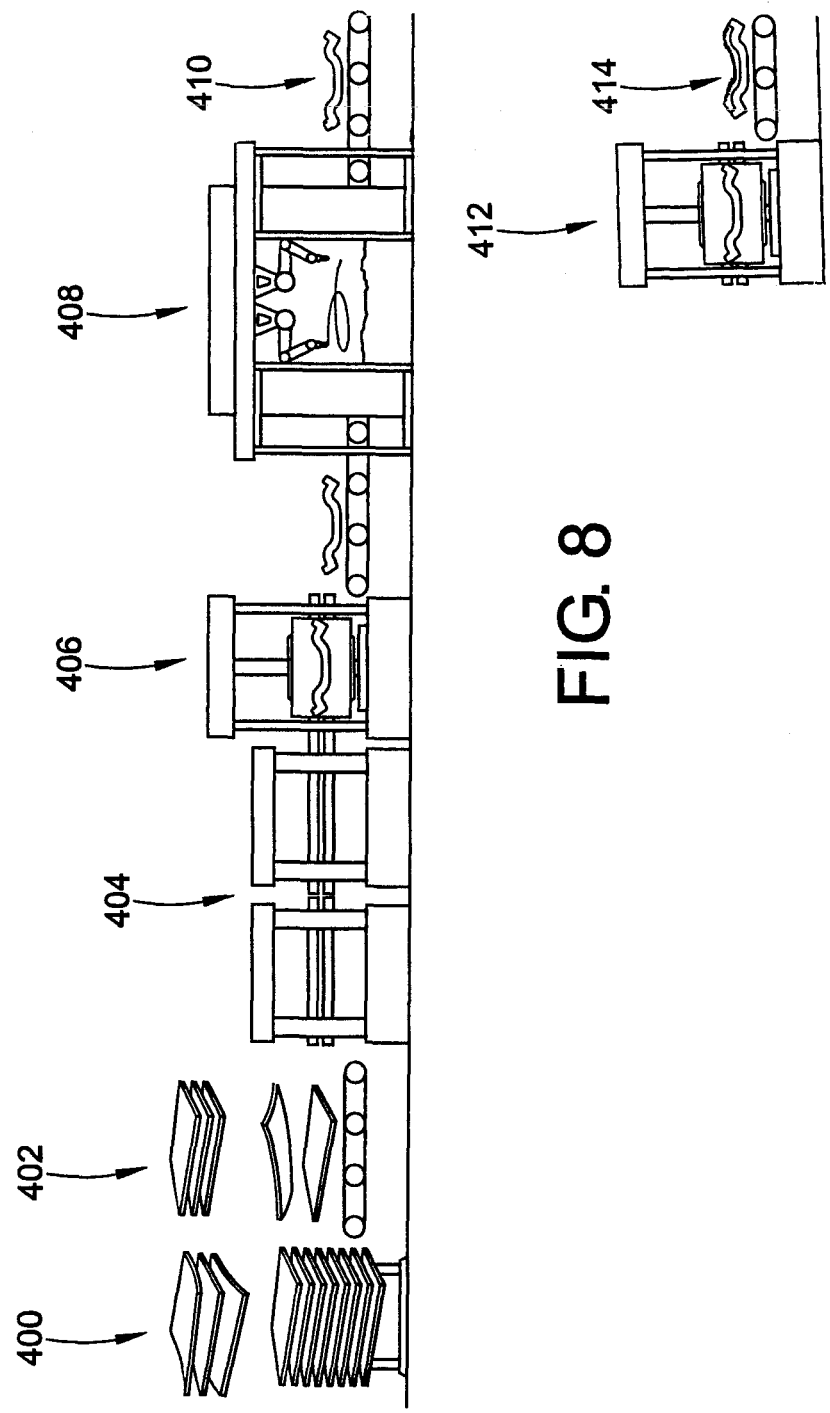

VEHICLE PILLAR CONSTRUCTION AND METHOD

BACKGROUND

The present exemplary embodiment relates to a composite article for a body structure of an automotive vehicle. It finds particular application in conjunction with vehicle pillars (posts), and will be described with particular reference thereto. However, it is to be appreciated that the present exemplary embodiment is also amenable to other similar applications.

Pillars are generally the vertical supports of the greenhouse of an automotive vehicle. Pillars can be referred to via letters such as A, B, C or D pillar, as referenced from the front to the back of the automotive vehicle (see FIG. 1). Pillars are implied. Accordingly, a greenhouse having a break between windows or doors without a vertical support at that position is nonetheless assigned a letter to that location. A non-existent pillar is skipped in the naming protocol such that a two door coupe has a front A-pillar and a rear C-pillar.

External objects can impact one or several of the pillars. Therefore, vehicle pillars constitute a part of a vehicle body which requires high rigidity to effectively absorb an impact from an external object. However, in the constant struggle to achieve increased energy efficiency, a rigid but light weight pillar is desirable.

Traditionally, a front or A-pillar of an automotive vehicle includes a steel outer body panel that extends between the vehicle door and a windshield. The outer body panel cooperates with a steel inner body panel and optionally a stiffener that is interposed between the inner and outer body panels. All three components include a door flange and a windshield flange, in which the respective flanges are secured together, e.g., are welded together. A garnish is then used to seal the pillar body panels from the interior of the vehicle.

The present disclosure describes a fiber reinforced polymeric composite forming an automotive pillar garnish having high rigidity and relatively low weight.

BRIEF DESCRIPTION

Various details of the present disclosure are hereinafter summarized to facilitate a basic understanding, however this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to a first embodiment, a pillar garnish component of a vehicle is provided. The pillar garnish component is comprised of an elongated body having a first layer of polyolefin and a second layer of thermoplastic polymer including at least one of synthetic and natural fibers.

According to a second embodiment, a method of making a pillar garnish component of a vehicle is provided. The method includes forming a fiber reinforced polymer shell and forming a polyolefin core and attaching the core to the shell via one of in-mold bonding or adhesion.

According to a further embodiment, an automotive vehicle including a pillar assembly is provided. The pillar assembly comprises a structural reinforcement member and an associated garnish. The garnish is constructed of an elongated polypropylene inner layer mated to a cooperatively shaped fiber filled polypropylene outer layer.

BRIEF DESCRIPTION OF THE DRAWINGS

The following description and drawings set forth certain illustrative embodiments of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which:

FIG. 6 is a cross-section taken along line B-B of FIG. 4;

FIG. 7 is a cross-section taken along line C-C of FIG. 4; and

FIG. 8 is a schematic illustration of the manufacturing process of the present disclosure.

DETAILED DESCRIPTION

Figure 1:
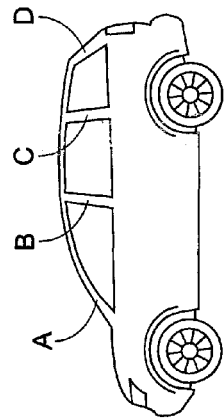
FIG. 1 is a side perspective view of an automotive vehicle designating pillar locations.
Figure 3:
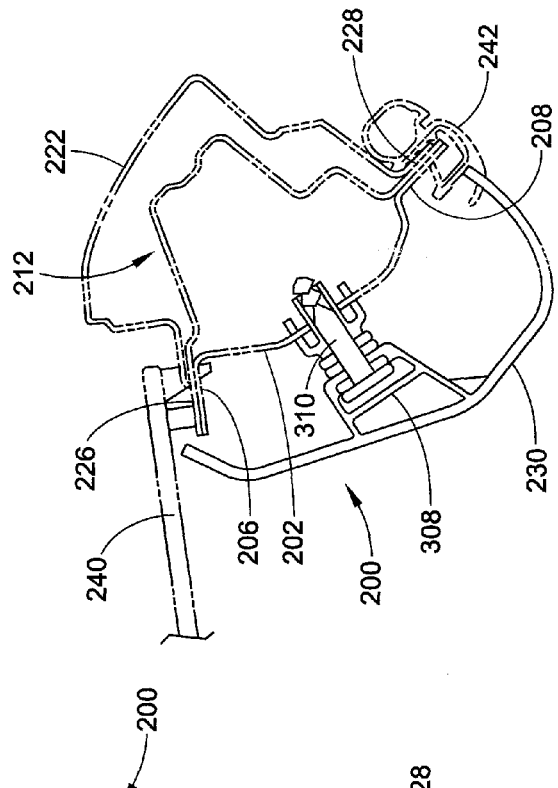
FIG. 3 is a cross-section of the pillar of FIG. 2.
Figure 2:
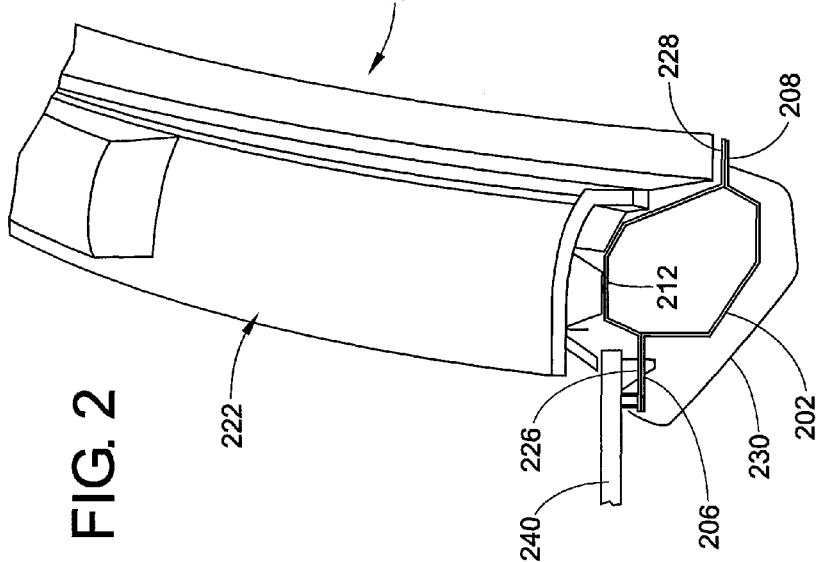
FIG. 2 is a perspective view of a front (A) pillar.
Figure 4:
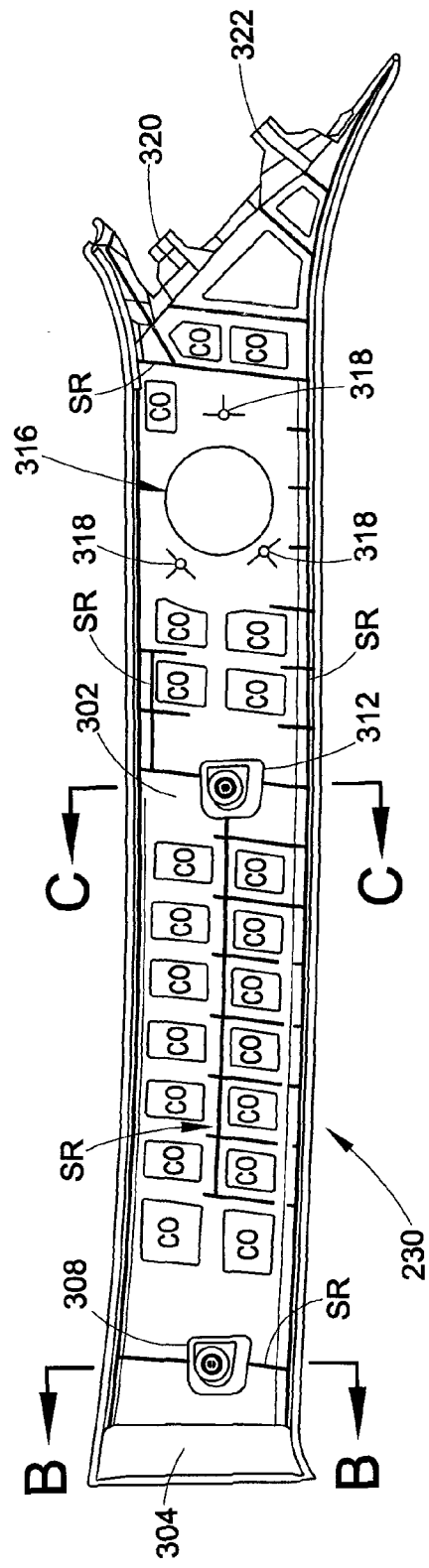
FIG. 4 is a front side perspective view of a pillar garnish of FIGS. 2 and 3.
Figure 5:
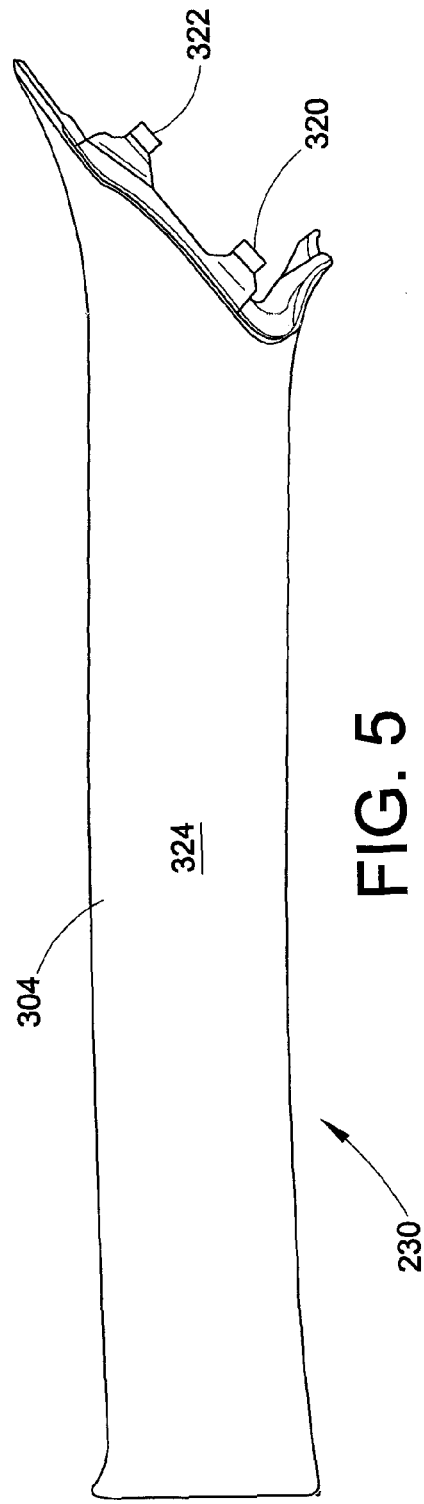
FIG. 5 is a rear side perspective view of the pillar garnish of FIG. 4.

With reference to FIGS. 2 and 3, an A-pillar 200 includes an inner body panel 202 having a windshield flange 206 along one edge and a door flange 208 along a second edge. The pillar 200 further includes an outer body panel 212 interposed between a windshield flange 226 and a door flange 228. Flanges 206/226 and 208/228 can be joined via welding.

A molding 222 overlies the exterior of the pillar 200. A pillar garnish 230 overlies the interior of the pillar 200 and extends between the windshield 240 and the door seal 242. Garnish 230 includes an integral garnish clip receiving projection 308 holding garnish clip 310 which mates with a cooperative passage in inner body panel 202.

Referring now to FIGS. 4-7, the pillar garnish 230 is depicted. The pillar garnish 230 includes a polyolefin inner stiffener layer 302 and a fiber filled polymeric outer layer 304. The polyolefin inner stiffener layer 302 is formed to include a garnish clip receiving projection 308 holding garnish clip 310. A door lining clip receiving projection 312 is provided to retain door mating clip 314. Clips 310 and 314 are received within cooperative passages in the automotive vehicle body to secure pillar garnish 230 in a suitable location.

Inner stiffener layer 302 is formed to include a plurality of weight reducing cut outs (CO) such that it is discontinuous and a plurality of stiffening ridges (SR) providing reinforcement zones where desired. The cut outs are provided to judiciously reduce the weight of the polyolefin inner layer 302. The stiffening ridges are provided to reinforce areas of inner stiffener layer 302 adjacent to the cut outs or in alternative areas in which added torsional strength is desired.

An opening 316 is provided for a speaker component assembly. Opening 316 includes adjacent passages 318 which are surrounded by radially extending stiffening ridges. Passages 318 are provided for speaker component attachment. Inner stiffener layer 302 is provided with projecting members 320 and 322 which facilitate pillar locating to ensure fit and finish to the instrument panel. Inner stiffener layer 302 can also be provided with other suitable attachment features and passages to accommodate automotive vehicle components such as safety features, an electrical harness, etc.

Polyolefin inner stiffener layer 302 can be comprised of a material such as polyethylene, polypropylene or mixtures thereof. Polyethylene is widely regarded as being relatively tough, but low in stiffness. Polypropylene generally displays the opposite trend, i.e., is relatively stiff, but low in toughness. Several well known polypropylene compositions have been introduced which address the toughness issue. For example, it is known to increase the toughness of polypropylene by adding rubber particles, either in-reactor or through post-reactor blending. These materials are viable options for each of the inner stiffener layer and polymeric outer layer of the present pillar garnish. The inner stiffener layer can have a weight of about 2400 g/m$^2$ or greater.

Fiber filled polymeric outer layer 304 can be comprised of a thermoplastic polymer selected from compounds including but not limited to polyester, acrylonitrile butadiene, styrene acrylic, EVA, fluoroplastics, polyamides, polybutadiene, polybutylene, PET, polystyrene, polyurethane, polyvinyl acetate, polycarbonate, polypropylene, polyethylene and mixtures thereof. The polymeric outer layer further includes at least one of synthetic or natural fibers. The fiber filled polymeric outer layer can have a weight of about 600 g/m$^2$ or less.

The fiber utilized can be synthetic, such as glass, aramid, carbon, polymeric, etc. or it can be a natural, such as flax, hemp, jute, kenaf, banana, pineapple, sisal, cotton, hair, wood, etc. Natural fiber may be desirable because of its sustainability and environmental friendliness. The fibers can be in the form of a woven fabric or can be in the form of chopped fiber or a combination thereof.

The polyolefin inner layer can be extruded, compression molded, or injection molded. The fiber filled thermoplastic outer layer can be similarly injection molded, compression molded, or extruded in sheet form. Moreover, the fiber filling can be intimately mixed with the thermoplastic polymer and injection molded or the fiber filling can be laminated with a thermoplastic resin sheet and thermo-compression formed. During the heated compression molding, the thermoplastic material and optionally the fibers are at least partially melted to create a matrix that binds the fibers within the thermoplastic material.

It is noted that the disclosure also contemplates molding, extruding or thermoforming the inner stiffener layer and the outer fiber reinforced layer together.

If chopped filling is used, the fibers can have a length, for example, within the range having a lower limit of ⅛ inch and an upper limit of ½ inch. The diameter of the chopped fibers or the woven sheet fibers can be for example, within the range having a lower limit of 10 .mu.m and an upper limit of 100 .mu.m. However, the length and diameter of the fiber employed in the fiber reinforced polymeric composite is not particularly restricted.

Furthermore, the fibers may include a surface coating and/or treatment to address moisture absorption, compatibility with the polymeric matrix, and microbe susceptibility, as examples.

The fiber filling can also exhibit different moments of plane area along its lengthwise direction. In order to minimize weight and to meet the strength requirements better in certain areas, it may be made thinner in certain areas or indeed it may have larger distances between its outer surfaces in comparison with other portions.

Similarly, in order to ensure good strength characteristics with low weight, it may be desirable for the fibers to be oriented in the principal normal stress directions. This means that the fibers can be oriented perpendicularly to the direction from which a possible impact on the vehicle pillar is to be expected.

The fiber reinforced polymeric outer layer can be formed from a composition that includes at least about 30 wt % fiber, based on the total weight of the composition of thermoplastic polymer as the matrix resin. The ratio between thermoplastic material and fibers can be within the range from 30:70 to 70:30, or can be from 30:70 to 50:50, and can be near 50:50.

In a particular embodiment, the matrix thermoplastic polymer can contain a modifier. Typical modifiers include, for example, unsaturated carboxylic acids, such as acrylic acid, methacrylic acid, maleic acid, itaconic acid, fumaric acid or esters thereof, maleic anhydride, itaconic anhydride, and derivates thereof. In another particular embodiment, the matrix thermoplastic polymer does not contain a modifier. In still yet another particular embodiment, the thermoplastic polymer further includes a grafting agent. The grafting agent includes, but is not limited to, acrylic acid, methacrylic acid, maleic acid, itaconic acid, fumaric acid or esters thereof, maleic anhydride, itaconic anhydride, and combinations thereof.

The matrix thermoplastic polymer, and in fact, the polyolefin forming the inner stiffener layer may further contain additives commonly known in the art, such as dispersant, lubricant, flame-retardant, antioxidant, antistatic agent, light stabilizer, ultraviolet light absorber, carbon black, nucleating agent, plasticizer, and coloring agent such as dye or pigment. Diffusion of additive(s) during processing may cause a portion of the additive(s) to be present in the fiber.

The pillar garnish can have a flexural modulus of at least about 270,000 psi. Advantageously, the fiber filling reduces the weight of the garnish without significantly sacrificing strength.

The pillar garnish 230 can further include a decorative surface layer 324. The decorative surface layer may be a top coat, a fabric material, a fleece material or a plastic film, as examples. Applying the decorative surface layer can be carried out simultaneously with formation of the substrate or it may be carried out in a subsequent step.

If an adhesion method is utilized in the manufacture of the pillar garnish, a glue layer 326, such as a polyamide, may be provided intermediate the inner stiffener layer 302 and the outer fiber reinforced layer 304. Hot melt adhesion is also contemplated.

The pillar garnish may also be associated with a B-pillar or any other pillar of a vehicle. At least in the case of a B or a C pillar the pillar garnish can be formed with passages and/or reinforced fastening portions corresponding to the position of a vehicle's mechanical elements, such as seat belts, sun visors, AV and/or HVAC equipment.

FIG. 8 provides a schematic illustration of one feasible manufacturing methodology. At step 400 a thermoplastic polymer board is provided which is assembled with a woven fiber fabric at step 402 to create a preform. The preform is introduced to a heating step 404 to achieve at least the softening point for the polymer. The preform is then compression molded at step 406 to yield an unfinished part which is trimmed as necessary at step 408. The finished fiber reinforced outer layer is available at step 410. An injection molding step 412 can be used to produce the polyolefin inner part at step 414. The part at step 410 and the part at step 414 can then be adhesively joined to form the garnish. In-mold trimming of the garnish edges can be performed as appropriate. It is also envisioned that the fiber reinforced outer layer and the polyolefin inner layer are simultaneously in-mold shaped and bonded.

The disclosed multi-layered panel meets the requirements of its various intended applications, including strength, self-stability, stiffness, noise insulation, temperature resistance, and the like, while also being cost economical and may be produced in a simple and uncomplicated manner and may also be disassembled or broken down for recycling purposes.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. A pillar garnish for use with an associated vehicle, the garnish comprising:
   an elongated rigid body having an inner stiffener first layer formed of a polyolefin and an outer second layer formed of a thermoplastic polymer, the outer second layer including at least one of synthetic or natural fibers, said inner stiffener first layer and said outer second layer being formed of different materials relative to one another.

2. The pillar garnish of claim 1 wherein said second layer has a thickness greater than said first layer.

3. The pillar garnish of claim 1 wherein said first layer has a vehicle facing side which includes a plurality of reinforcement ribs.

4. The pillar garnish of claim 1 wherein said first layer is discontinuous.

5. The pillar garnish of claim 1 wherein said polyolefin is polypropylene.

6. The pillar garnish of claim 1 wherein said second layer is formed of between 30:70 to 70:30 polymer to fiber.

7. The pillar garnish of claim 1 wherein an outer surface of said second layer includes one of a fabric, film and coating.

8. The pillar garnish of claim 1 further comprising a clip retention projection integrally formed on said first layer.

9. The pillar garnish of claim 1 wherein said fibers comprise a woven sheet.

10. The pillar garnish of claim 1 further comprising an adhesive layer intermediate said first and second layers.

11. The pillar garnish of claim 1 wherein said thermoplastic polymer comprises polypropylene.

12. A method of making a rigid pillar garnish, comprising:
    forming an outer shell formed of a fiber filled thermoplastic,
    forming an inner stiffener core formed of a polyolefin, said outer shell and said inner stiffener core being formed of different materials relative to one another, and
    attaching said inner stiffener core to said shell by one of in-mold bonding or an interposed adhesion layer.

13. The method of claim 12 further comprising securing said garnish to a pillar of a vehicle.

14. The method of claim 12 further comprising securing said garnish to a pillar of a vehicle.

15. An automotive vehicle including a pillar assembly, said assembly comprising:
    a structural reinforcement member and an associated garnish, the garnish formed of an elongated polypropylene fiber free inner stiffener layer mated to a cooperatively shaped fiber filled polypropylene outer layer, wherein a material forming the inner stiffener layer has a higher weight expressed in g/m2 than a material forming the outer layer.

16. The vehicle of claim 15 wherein said inner stiffener layer is discontinuous.

17. The vehicle of claim 15 wherein said inner stiffener layer includes integral clip retention projections.

18. The vehicle of claim 15 wherein said inner stiffener layer includes an integral structure suited to accommodate at least one mechanical component.

19. The vehicle of claim 15 wherein said outer layer is thicker than said inner stiffener layer.

20. The pillar garnish of claim 1 wherein the material of said inner stiffener first layer has a weight of about 2400 g/m2 or greater and the material of said outer second layer has a weight of about 600 g/m2 or less.

21. The pillar garnish of claim 1 wherein said inner stiffener first layer and said outer second layer are different materials as a result of a presence of fibers in the outer second layer.

* * * * *